United States Patent [19]
Lechner et al.

[11] Patent Number: 5,274,694
[45] Date of Patent: Dec. 28, 1993

[54] RADIO COMMUNICATION NETWORK BASED ON DIGITAL LOCAL EXCHANGES

[75] Inventors: Robert Lechner, Böheimkirchen, Austria; Josef Forer, Wein, Italy

[73] Assignee: Siemens Aktiengesellschaft, Munich, Fed. Rep. of Germany

[21] Appl. No.: 861,965

[22] PCT Filed: Dec. 19, 1990

[86] PCT No.: PCT/EP90/02258
§ 371 Date: Jun. 17, 1992
§ 102(e) Date: Jun. 17, 1992

[87] PCT Pub. No.: WO91/10333
PCT Pub. Date: Jul. 11, 1991

[30] Foreign Application Priority Data
Dec. 22, 1989 [AT] Austria ................... 2924/89

[51] Int. Cl.⁵ .......................................... H04M 11/00
[52] U.S. Cl. .......................................... 379/63; 370/60
[58] Field of Search ............... 370/60, 170.1; 379/56, 379/58, 61, 63; 455/2, 5, 8, 9, 12, 16, 33.1

[56] References Cited
U.S. PATENT DOCUMENTS

| | | | |
|---|---|---|---|
| 3,626,112 | 12/1971 | Henquet | 379/63 |
| 4,592,048 | 5/1986 | Beckner et al. | 370/60 |
| 5,175,866 | 12/1992 | Childress | 455/8 |

Primary Examiner—Jin F. Ng
Assistant Examiner—William D. Cumming
Attorney, Agent, or Firm—Hill, Steadman & Simpson

[57] ABSTRACT

Cordless network terminating units (CNTn) with a remote power-feeding device are connected via U interfaces (U) to a radio communication network with digital local exchanges (DIV-O). The cordless network terminating unit (CNTn) is associated with mobile sections (MT1-MT80). The cordless network terminating units (CNTn) are connected via digital subscriber line modules (SLMD) and digital subscriber line units (DLU) via a packet switching network (Datex-P) to the data processing system (SP) of a service provider. When a connection is being set up, the authorization of the subscriber is directly checked with a database as "authentication" by the service provider. The data transmission occurs via a composite p channel of the ISDN network. This makes it possible to implement party lines and operate different service networks.

15 Claims, 1 Drawing Sheet

RADIO COMMUNICATION NETWORK BASED ON DIGITAL LOCAL EXCHANGES

BACKGROUND OF THE INVENTION

The invention relates to a radio communication network based on digital local exchanges which contain digital subscriber line units with digital subscriber line modules to which subscriber lines with network terminating units at the subscriber end are connected, each network terminating unit being connected to a subscriber line module via the subscriber line by means of a data channel and the data channels being concentrated to one or more composite data channels in the local exchange, the composite data channels being connected via a data network to a data processing system of a service provider.

Such communication systems are used for setting up "Intelligent Networks", or the mobile telephone C network. Intelligent networks also form the basis for setting up future cellular radio networks. They make it possible to tie service providers into the conventional telephone network. Concepts are described, for example, in telcom report, 1989, volume 4 (page 102-105) and volume 5 (page 142-145) under the titles "Intelligente Netzeleistungsfähige Basis für zukünftige Dienste" (Intelligent Networks-Efficient Basis for Future Services) and "Intelligente Netze beschleunigen Einführung neuer Dienste" (Intelligent Networks Accelerate the Introduction of New Services).

ISDN exchanges are also described in, inter alia, telcom report, March/April 1986, volume 2, page 111-117 under the title "Digitale Teilnehmerleitungseinheitim System EWSD für ISDN-Teilnehmeranschlüsse" (Digital subscriber line unit in the EWSD system for ISDN subscriber lines). Two voice channels and one data channel are switched through via a switching network as a connection between two subscribers. The data channel is operated as a packet-oriented channel for the subscriber signalling and for slow data (packetized data including telemetry data). The different data are separated in the digital subscriber line module within a digital subscriber line unit. The packet data are conducted via a p channel to an interface module and the data of the subscriber signalling are conducted via an s channel to a second interface module. The exchange can also be connected to, inter alia, data networks, for example a packet data network. Such a communication system enables the network operator to offer various voice and data services to the subscribers.

From WO 86/6915, a system is known by means of which a radio network for cordless telephones is operated by interposition of a separate radio exchange in the area of a private branch exchange. Voice transmission is digital. In this arrangement, connections with several mobile sections can be set up for each base station. If necessary, the radio exchange can switch a connection from one base station to another one which has a better transmission quality. Switching information items are exchanged via a common signalling channel or a time slot in the voice channel. This is therefore a private radio telephone network of the mobile telephone network type. The user circle is restricted to the few mobile sections connected and there is no separate authorization check. Subscriber identification will therefore generally occur via the access number and a personal identification number of the mobile section. Voice transmission is digital.

SUMMARY OF THE INVENTION

The invention is based on the object of increasing the mobility and availability of the subscribers within an Intelligent Network by means of radio communication.

This is achieved by the fact that network terminating units, as cordless network terminating units, contain a radio section, and a cordless network terminating unit is designed in such a manner that remote power feeding occurs via the subscriber line from the local exchange, several cordless subscribers are allocated to one cordless network terminating unit, an authorization check being carried out before an outgoing connection is switched through and, in the case of an incoming connection, the respective directory number of the corresponding cordless subscriber being transmitted from the local exchange via the respective data channel to the cordless network terminating unit, and the cordless subscriber being called by radio, that several voice channels can be switched at the same time between the cordless network terminating unit and the local exchange and that administrative data can be exchanged between the cordless network terminating unit and the data processing installation of the service provider.

The radio communication network according to the invention provides a wireless home line, the data traffic for the authorization check taking place independently of the subscriber signalling in parallel with the setting up of the connection. Thus, a service provider with an "on-line" access to a central memory (database) can carry out an authorization check as so-called "authentication" directly in "basic access". Services with centralized data acquisition, a processing center and/or an invoicing and administration center can be integrated into conventional communication systems. Several service providers can operate the same or different service networks. Conventional wire lines can be retained.

Due to the radio network, better use is made of already existing lines and, in particular, the network can be extended rapidly and with little constructional expenditure in currently undersupplied regions. Remote power feeding makes it possible to do without a power system connection at the location of the cordless network terminating unit. This facilitates installation, for example in protected boxes on public ground. The conventional telephone line is thus replaced by a radio link from a connecting box. This increases the mobility and availability of the subscribers and there is no longer any need for new cabling for newly connecting a subscriber or extending the range of services. It is also possible to offer services such as telecopying, teletex, teletype or data transmission, in addition to conventional voice transmission, via the radio link.

To achieve a higher call density, it is advantageous that several cordless subscribers are permanently allocated to one cordless network terminating unit in the local exchange. The personal identification number of each subscriber can be used for selective calling. Better utilization of the lines is achieved by one collective line being set up for several cordless network terminating units in the local exchange. As a result, a larger number of cordless subscribers can set up a connection with each of the cordless network terminating units, depending on the traffic volume.

To achieve better utilization of special services, particularly by national postal administrations and in the setting-up phase of the radio communication network, it is advantageous if the data processing system of the service provider is integrated in the local exchange.

When setting up a "Telepoint" system, it is advantageous if the cordless subscriber is also available for incoming calls in the radio zone of other cordless network terminating units as well as that allocated to it. This is made possible by providing in the local exchange a call diversion facility which is activated by a cordless subscriber when he is located in the radio zone of a different cordless network terminating unit. Privacy and unambiguous charge allocation are retained as in the case of conventional cordless telephones. Thus, the "Telepoint" system can be set up in accordance with the ETSI standard.

To combine this system with conventional technology, it is advantageous if a mobile section and a wire line exist for a cordless subscriber and if, in the local exchange, a call is automatically diverted from the wire line to the mobile section when the subscriber does not respond on the wire line or the call diversion facility is activated. If the mobile section is taken into operation only as required, radio channel capacity is saved and the battery of the mobile section is not loaded by being continuously on standby. If the subscriber wants to be continuously available, the mobile section automatically forwards the call diversion if the mobile section is in the radio zone of a different cordless network terminating unit.

An appropriate configuration is given by the fact that the cordless network terminating unit contains the radio section, an adaptor device with radio frequency multiplex control, a line terminating module, a microcomputer and a remote power-feeding device. The microcomputer converts the signalling protocols of the subscriber line to those of the radio link and handles the control of the radio section. It is advantageous for a cordless or Telepoint system if the radio section is configured with a time-and/or frequency-division multiplex device. This also corresponds to the DECT standard and facilitates the coverage of densely populated areas. Due to the fact that the cordless network terminating unit is designed as a party line, a "party-line telephone", for example, can be integrated into a digital communication system in the phase of converting the previous telephone network.

To achieve more rapid introduction of the radio communication network according to the invention, it is advantageous if the network is configured as an integrated network in accordance with the ISDN standard, if the cordless network terminating unit is connected to the digital subscriber line module via a U interface and to the subscriber line unit via a D channel for transmitting the service data or the authorization as p data, and if the data processing installation of the service provider is connected to the local exchange via the composite data channel of a packet switching network. A power of 1 Watt can be transmitted to the cordless network terminating unit for remote power feeding. This is sufficient for supplying the radio section with the relatively low transmitting power required for communicating with mobile sections. When the cordless subscriber is permanently allocated to the cordless network terminating unit, s signalling is used. In the transition phase, analog wire subscribers can also be simultaneously connected to the communication network. The composite data channel is used for implementing a routing process. A private branch exchange in accordance with the ISDN standard can also be used as the communication network.

If necessary, it is advantageous for voice coding to be carried out on the radio link with a fraction of 64-kBit/s and at least one B channel between the cordless network terminating unit and the local exchange to be subdivided into two or more channels by time-division multiplex and the transmission code to be converted to the 64-kBit/s standard in the local exchange, and, if necessary, for several connections of cordless network terminating units to be set up with a correspondingly reduced transmission rate for each B channel. According to the ETSI standard, a transmission rate of 32-kBits/s is possible for cordless or radio telephones. For special applications, however, eight voice channels of 16-kBit/s each, for example, can also be switched through via the two B channels of a line. The transmission code can even be converted, for example, in the subscriber line module. It is advantageous, particularly for professional communication using different media, if a cordless subscriber can be connected to the local exchange via several voice and/or data channels. The data exchange in the radio communication network is made more efficient if the cordless network terminating unit contains a call-charge data memory and the call charge data are transmitted to the data processing system of the service provider when the call is finished.

To implement, for example, the S bus in the ISDN standard, the cordless network terminating unit additionally contains local power feeding and is equipped with supplementary functions.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

Figure 1:
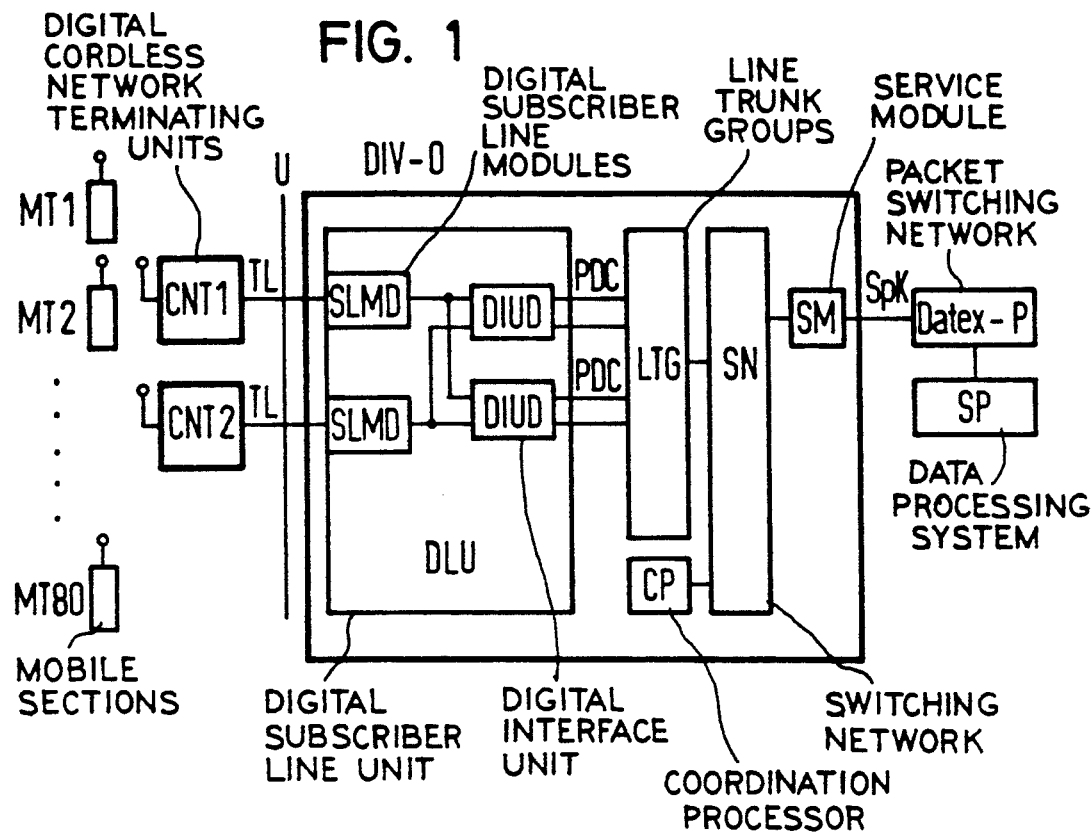
FIG. 1 shows the diagrammatic configuration of the illustrative embodiment.

FIG. 1 shows a radio communication network with digital local exchanges DIV-O. For ISDN subscriber lines, the local exchanges DIV-O contain digital subscriber line units DLU with digital subscriber line modules SLMD. The digital subscriber line units DLU are connected via primary-rate multiplex lines and line trunk groups to the switching network of the respective local exchange DIV-O. If necessary, digital subscriber line units DLU can also contain analog subscriber line modules. Similarly, analog subscriber and junction lines can be directly integrated with a line trunk group in the local exchanges DIV-O. The switching network is controlled by a coordination processor in accordance with control information items from a modified common-channel signalling system No. 7.

Digital cordless network terminating units CNTn are connected via U interfaces U and subscriber lines TL to the digital subscriber line modules SLMD. Mobile sections MTn are used as telephone sets by the cordless subscribers, the cordless network terminating units CNTn being installed in the street as connecting boxes. If then a new cordless subscriber is added, no further lines need to be run since the cordless subscriber receives only one mobile section MTn. The new line is accepted via the radio communication network.

The mobile section MTn is configured similarly to the mobile section of a cordless telephone. An outgoing call of a cordless subscriber, received in the cordless network terminating unit CNTn, is converted to a transmission rate of 32-kBit/s. According to the ISDN standard, two B channels and one D channel are transmitted via the subscriber line TL. Halving the transmission rate makes it possible to transmit four voice channels simultaneously to the local exchange DIV-O.

The D channel is subdivided into an s channel for a subscriber signalling and into a p channel for packet data. Via this p channel, data of the subscriber identification and for authorization checking are transmitted as service data of the cordless network terminating unit CNTn. In the digital subscriber line module SLMD, the B channels are forwarded and the D channel is separated into the s channel and p channel. The p channels are combined to form a composite p channel in "basic access", via a digital interface unit of the digital subscriber line unit DLU. This composite channel is conducted as a 64-kBit/s user channel via the primary-rate multiplex line, a line trunk group and the switching network to a service module of the local exchange DIV-O. The composite p channel is connected by means of routing to a Datex-P packet switching network, via this service module and a composite data channel SpK. This Datex-P packet switching network enables the data processing system SP of a service provider to process and manage the data contained in the p channel. Thus, for example, a telepoint or paging system can be set up and operated by the service provider.

The cordless network terminating unit CNTn manages 20 mobile sections MTn according to the DECT standard, for each voice channel. Thus, 80 mobile sections MT1-MT80 are allocated to one cordless network terminating unit CNTn. By installing mobile sections MTn in communication terminals, telecopiers and so forth can also be connected by radio to the communications network.

Figure 2:
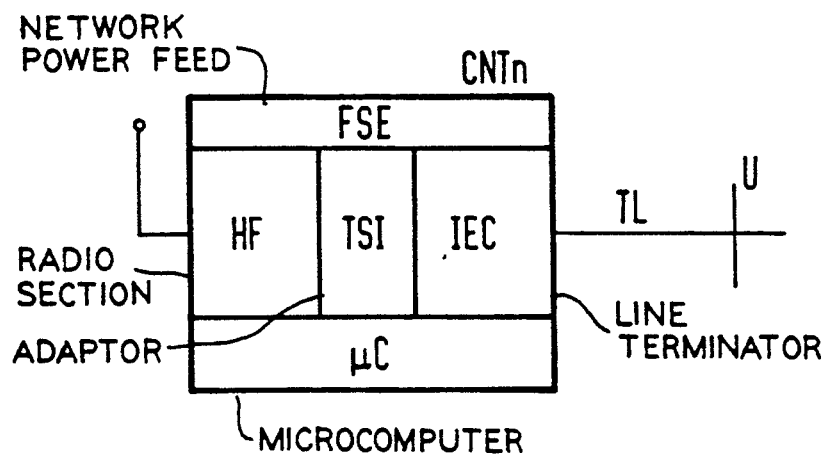
FIG. 2 shows a block diagram of a radio network terminating device.

FIG. 2 shows the configuration of the cordless network terminating unit CNTn. It contains a network power-feeding device FSE, a radio section HF with channel selection system, an adaptor device TSI (time-slot interchanger) with radio-frequency multiplex control (TDMA method) and a line terminating chip IEC. The line terminating chip IEC controls conversion of the signalling protocol and represents a radio interface for the D channel. The s data are generated, the call charges are determined and, depending on configuration, several calls can also be transmitted at the same time. The authorization of a mobile subscriber is transmitted by the service provider via the authentication procedure and if the test result is positive, the connection is switched through. A microcomputer μC converts the signalling protocols of the subscriber line TL to those of the radio link and controls the radio section HF. The remote power-feeding device FSE supplies the cordless network terminating unit CNTn with 1 W via the subscriber line TL from the local exchange with the power necessary for operation.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A radio communication network having digital local exchanges which contain digital subscriber line units with digital subscriber line modules, to which subscriber lines with network terminating units at a subscriber end are connected, each network terminating unit being connected to a digital subscriber line module via the subscriber line by means of a data channel and the data channels being concentrated to one or more composite data channels in the local exchange, the composite data channels being connected to a data processing system of a service provider via a data network, comprising:

network terminating units, as cordless network terminating units, having a radio section, and the cordless network terminating units being remote power fed via the subscriber lines from the local exchange, several cordless subscribers allocated to one cordless network terminating unit, the data processing system of the service provider, having a data base, providing means for checking utilization authority of a cordless subscriber before an outgoing connection is switched through, and means for transmitting a respective directory number of the cordless subscriber, responsive to an incoming connection, from the local exchange via the respective data channel to the respective cordless network terminating unit and for calling the cordless subscriber by radio, several voice channels being switchable at the same time between the cordless network terminating unit and the local exchange, and means for exchanging administrative data between the cordless network terminating unit and the data processing system of the service provider.

2. The radio communication network as claimed in claim 1, wherein several cordless subscribers are permanently allocated to one cordless network terminating unit of the local exchange.

3. The radio communication network as claimed in claim 1, wherein a collective line is provided for several cordless network terminating units of the local exchange.

4. The radio communication network as claimed in claim 1, wherein the data processing system of the service provider is integrated in the local exchange.

5. The radio communication network as claimed in claim 1, wherein means for call diversion are provided in the local exchange, said means for call diversion being activated for cordless subscribers which are located within a radio zone of a different cordless network terminating unit.

6. The radio communication network as claimed in claim 5, wherein a cordless subscriber has a mobile section and a wire line, and wherein in the local exchange the call is automatically diverted from the wire line to the mobile section when the subscriber does not respond at the wire line or the call diversion facility is activated.

7. The radio communication network as claimed in claim 5, wherein the mobile section contains a switching function transmitter for automatic call diversion during a hand-over into a radio zone of a different cordless network terminating unit.

8. The radio communication network as claimed in claim 1, wherein the cordless network terminating unit contains the radio section, an adaptor device with radio-frequency multiplex control, a line terminating chip, a microcomputer and a remote power-feeding device.

9. The radio communication network as claimed in claim 1, wherein the radio section is configured with a time- and/or frequency-division multiplex device.

10. The radio communication network as claimed in claim 1, wherein the cordless network terminating unit is designed as a party line.

11. The radio communication network as claimed in claim 1, wherein the network is configured as an integrated network in accordance with the ISDN standard, wherein the cordless network terminating unit is connected to the digital subscriber line module via a U interface and to the subscriber line unit via a D channel for transmitting service data or an authorization as p data, and wherein the data processing system of the service provider is connected to the local exchange via a composite data channel of a packet switching network.

12. The radio communication network as claimed in claim 11, wherein voice coding on a radio link is done at a fraction of 64-kBit/s and at least one B channel between the cordless network terminating unit and the local exchange is subdivided into two or more channels by time-division multiplex and the transmission code is converted to the standard of 64-kBit/s in the local exchange and, wherein several connections are set up with correspondingly reduced transmission rate by cordless network terminating units, when a transmission rate of one of said two or more channels of said at least one B channel is insufficient for a connection.

13. The radio communication network as claimed in claim 12, wherein one cordless subscriber can be connected to the local exchange via several voice and/data channels.

14. The radio communication network as claimed in claim 1, wherein the cordless network terminating unit contains a call-charge data memory and the call-charge data is transmitted to the data processing system of the service provider when the call is finished.

15. The radio communication network as claimed in claim 1, wherein the cordless network terminating unit additionally contains local power feeding.

* * * * *